C. C. SELEY.
WIRE BENDING MACHINE.
APPLICATION FILED AUG. 11, 1916.
1,257,748.
Patented Feb. 26, 1918.
5 SHEETS—SHEET 3.
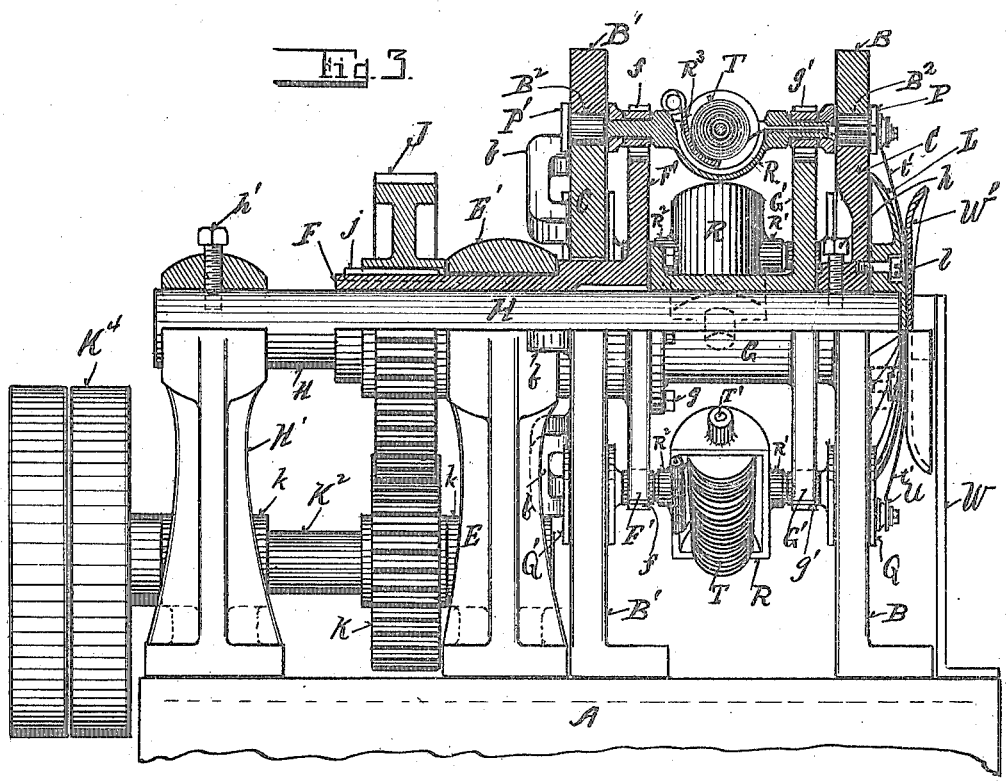
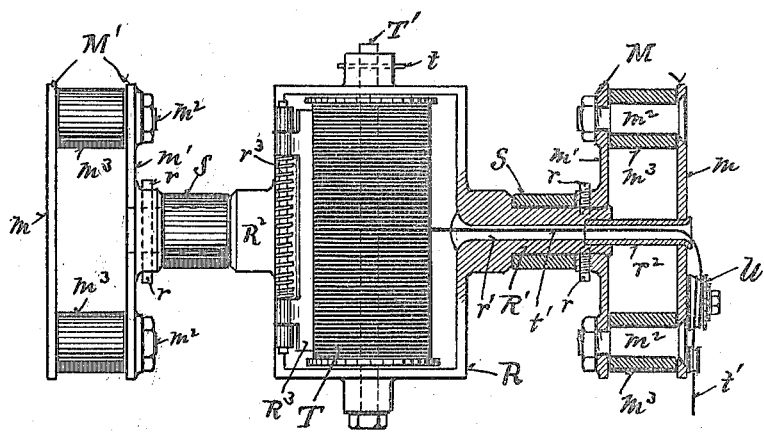
Inventor.
Charles C. Seley C. C. SELEY.
WIRE BENDING MACHINE.
APPLICATION FILED AUG. 11, 1915.
1,257,748.
Patented Feb. 26, 1918.
5 SHEETS—SHEET 4.
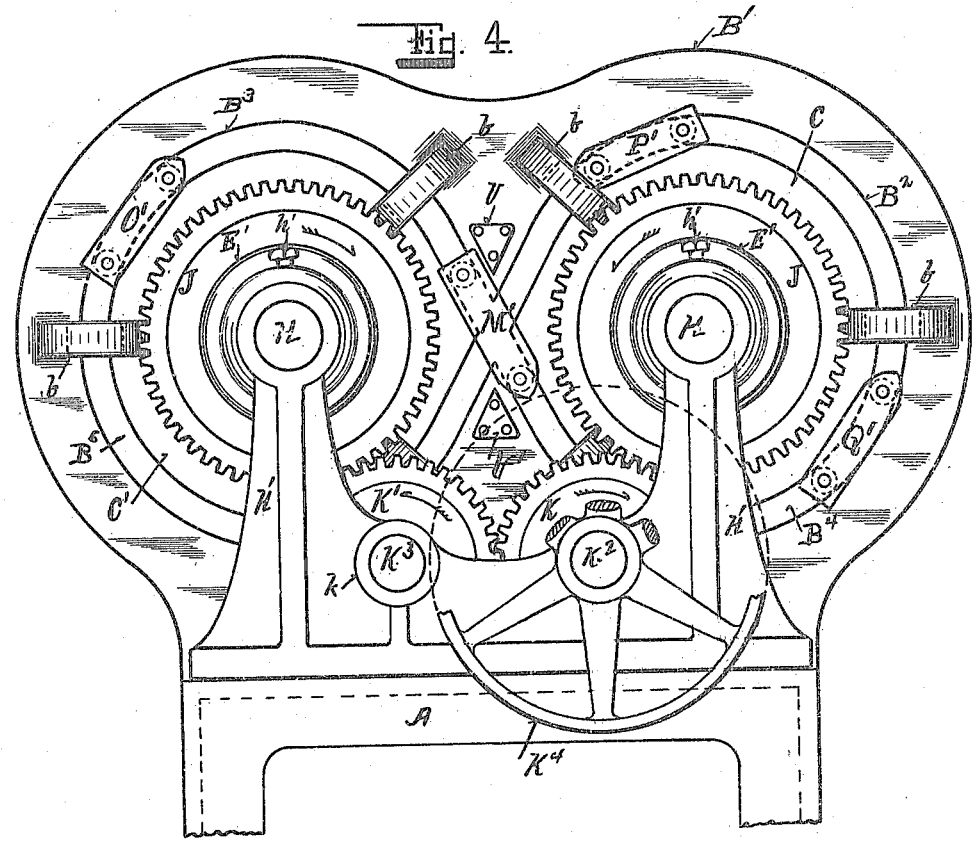
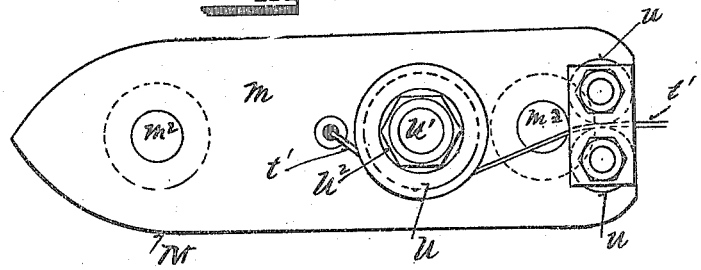

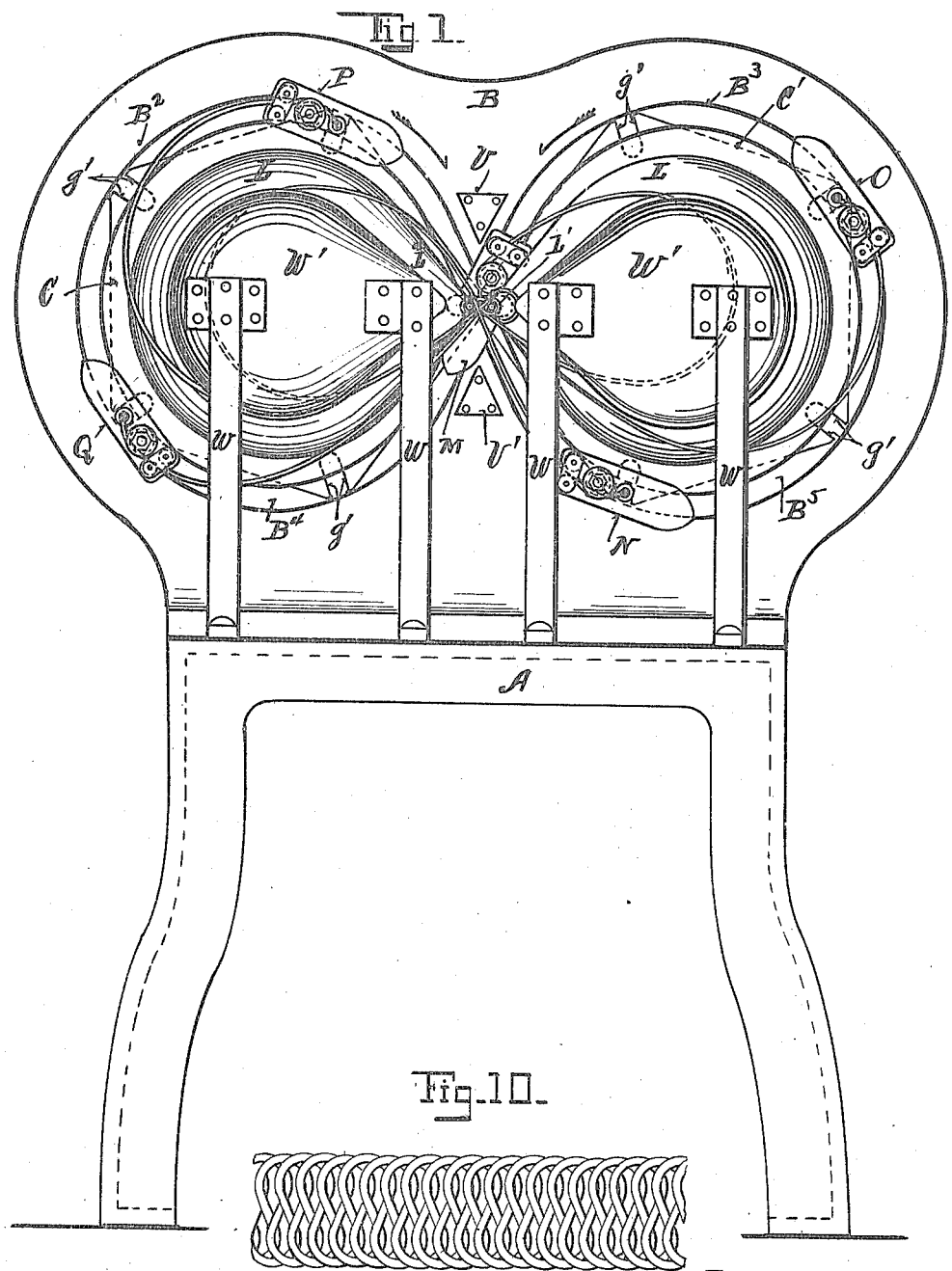

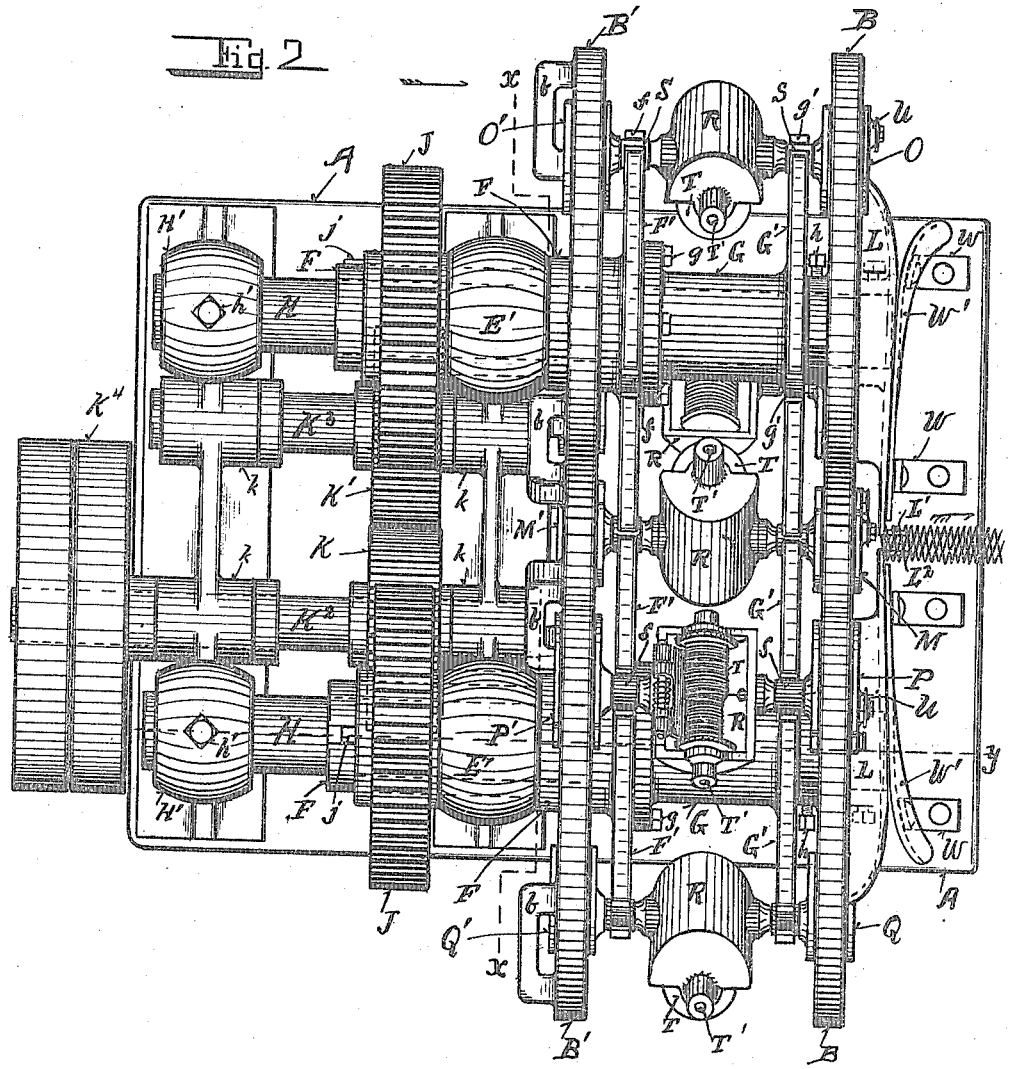

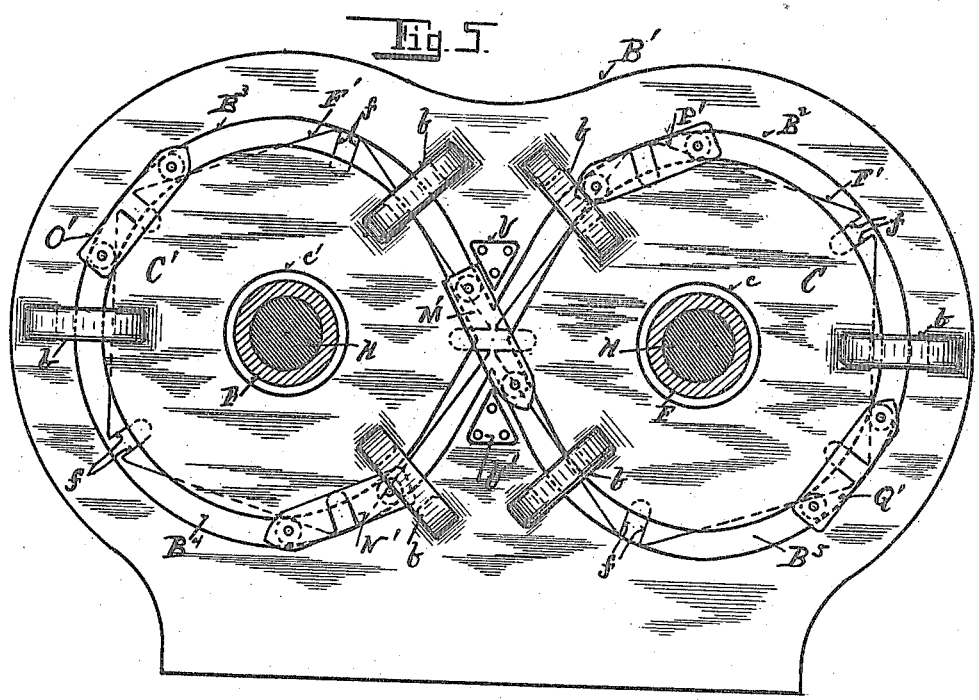
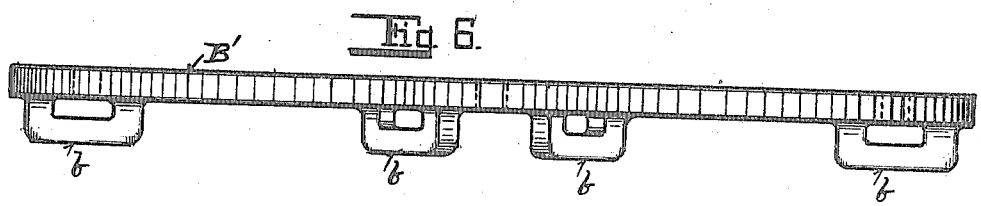
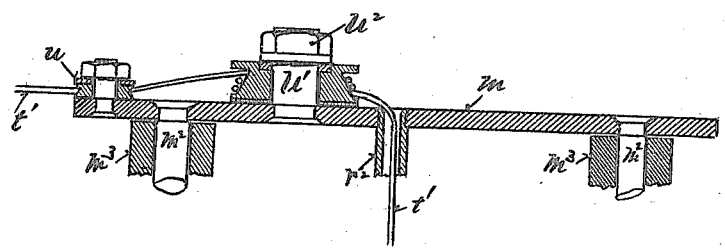

UNITED STATES PATENT OFFICE.

CHARLES C. SELEY, OF CORRY, PENNSYLVANIA, ASSIGNOR TO GEORGE H. BARLOW AND JOSEPH J. DESMOND, BOTH OF CORRY, PENNSYLVANIA.

WIRE-BENDING MACHINE.

1,257,748.   Specification of Letters Patent.   Patented Feb. 26, 1918.

Application filed August 11, 1916. Serial No. 114,392.

*To all whom it may concern:*

Be it known that I, CHARLES C. SELEY, a citizen of the United States, residing at Corry, in the county of Erie and State of Pennsylvania, have invented certain new and useful Improvements in Wire-Bending Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to wire-bending machines, and consists in certain improvements in the construction thereof, as will be hereinafter fully described and pointed out in the claims.

The machine, as exemplified in the drawings, is particularly adapted to forming stays for corsets, and the like; and as shown, is arranged to form the wire coils, which, when flattened down form a wire stay similar to that shown in Figure 10 of the drawings.

This invention as shown in the drawings hereinafter described, is primarily for an improvement in the construction of the type of wire-bending machine shown and described in U. S. Letters Patent No. 977,515, issued to John R. Dean, December 6, 1910; the objects of the present invention being to so construct a wire-bending machine that the spool carriers or shuttles are supported from opposite sides, so that spools containing greater weights of wire can be used than is possible when the shuttles are supported from but one side; and also to provide suitable brake or tension mechanism in the shuttles to regulate the rotation of the spools during the operation of the machine. It further consists in certain novel features of construction, which will be more particularly pointed out in the specification and claims, and which are illustrated in the accompanying drawings, as follows, viz:

Fig. 1 is a front end view of a wire-bending machine embodying my invention.

Fig. 2 is a top or plan view of the same.

Fig. 3 is a side view, partially in central section and partially in elevation, of my improved wire bending machine.

Fig. 4 is a rear end view of the same with a portion of the driving pulley broken away.

Fig. 5 is a view of the rear raceway plate on the line $x$—$x$ in Fig. 2, looking in the direction of the arrow.

Fig. 6 is an upper edgewise view of the same.

Fig. 7 is a plan view of my improved shuttle mechanism, with a portion thereof in horizontal section, also shown in vertical transverse section in Fig. 3.

Fig. 8 is an enlarged front end view of one of the shuttle plates shown in Fig. 1.

Fig. 9 is a central longitudinal section of the same.

Fig. 10 is a plan view of the finished article made by this machine.

In these drawings A indicates the base frame or supporting stand of the machine, upon which I place upright guide-plates B and B'; the front plate B being provided with openings $B^2$ and $B^3$, which are connected; the outer edge of which openings forms the outside wall of the shuttle raceways $B^4$ and $B^5$. Within the openings $B^2$ and $B^3$, I place cam plates C and C', the outer edges of which coincide with the curvature of the openings $B^2$ and $B^3$, and are in spaced relation thereto, so that between the perimeters of the cam plates C and C', and the walls of the openings $B^2$ and $B^3$, there is an open raceway in the form of a figure 8.

The cam plates C and C' are supported within the openings $B^2$ and $B^3$, as hereinafter described; behind the guide-plate B, and upon the base stand A, I place the guide-plate B' (see Fig. 5), which is spaced away from the guide-plate B. In this guide-plate B', the cam-plates C and C' are supported by bridge loops $b$, which bridge over the raceways $B^4$ and $B^5$, therein, so that the rear shuttle plate hereinafter described, can pass through said loops in its traverse of said raceway.

The cam-plates C and C', in the guide-plate B', are provided with central openings $c$ and $c'$, for the purpose hereinafter set forth. Upon the base frame A, behind the guide-plate B', I secure upright journal bearing brackets E, provided at the upper ends thereof with journal bearings E'. Within each journal bearing E', I place a hollow sleeve shaft F, which extends forwardly through the central openings $c$ and $c'$, in the cam-plates C and C', in the rear guide-plate B', the said sleeve shafts F being each provided at the other end thereof with a disk F', said disk F' having radial slots $f$ in the perimeter thereof, for the purpose hereinafter set forth.

Concentrically secured upon the disk F' is a sleeve hub G, by means of bolts $g$, shown in Fig. 3; said sleeve hub G being provided at the front end thereof with a disk G', like the disk F'; said disk G' being provided with radial slots $g'$ in the perimeter thereof, which slots $g'$ and $f$ are arranged in axial parallelism; the disk F' being immediately adjacent to the front side of the guide-plate B', and the disk G' being immediately adjacent to the rear side of the guide-plate B.

Within the sleeve shafts F and hubs G, I place non-rotatable shafts H, which project forwardly through the sleeve hubs G and disks G'; and cam-plates C and C', within the front guide-plate B, being secured upon the shafts H by means of set-screws $h$ (see Fig. 3). The rear ends of the shafts H are supported in brackets H', being non-rotatably secured therein by means of set-screws $h'$, so that the cam-plates C and C', within the guide-plate B, and the front end of the rotors (composed of the sleeve shaft F, disk F', hub G, and disk G') are supported upon the front ends of the non-rotatable shafts H.

The disks F' and G' revolve toward each other as viewed from above, and for the purpose of causing them so to revolve, and in order that the gears will be of less diameter than the loops of the figure "8," raceways, so as not to project outwardly beyond the plane thereof, I secure upon each sleeve shaft F a spur gear wheel J, by means of keys $j$ or in any other manner desired.

Below the gears J—J and intermeshing therewith, I mount intermeshing spur gears K and K', upon shafts $K^2$ and $K^3$, which are journaled in the bearings $k$ supported upon the stand A; and upon the shaft $K^2$ I secure a driving pulley $K^4$, so that as the spur gears K and K' are caused to revolve in the direction of the arrows thereon, the spur gears J—J and the disks F' and G' will be caused to revolve toward each other, as indicated by the arrows in Figs. 1 and 4.

Upon the front end of each of the shaft H (see Fig. 3) I place a plate L, which plates are non-rotatably secured thereon by means of screws $l$, which, passing therethrough, screw into the cam-plates C and C'. This is a convenient manner of securing said plates L in place; but I do not desire to be limited thereto, because many other ways of securing said parts together may be employed without departing from the scope of my invention.

The plates L (see Figs. 1, 2 and 3) fit securely against the cam-plates C and C', within the guide-plate B, and have their outer curved edges arranged as shown in Figs. 2 and 3, and extend over the raceways $B^4$ and $B^5$ at their adjacent edges, where they are provided with pins L' and $L^2$ (see Figs. 1 and 2). Slidably mounted in the raceways $B^4$ and $B^5$ in the guide-plate B, is a series of shuttles M, N, O, P and Q (see Fig. 1), each of these shuttles being composed of a front plate $m$ and rear plate $m'$, secured together by means of bolts $m^2$, upon which are mounted rollers $m^3$, which operate as anti-friction bearings in the raceways $B^4$ and $B^5$ (see Fig. 7).

In the race-ways $B^4$ and $B^5$, in the rear guide-plate B', is another series of shuttles M', N', O', P' and Q' (see Fig. 5), which are duplicates of the shuttles which operate in the guide-plate B. Between each pair of shuttles M—M', N—N', O—O', P—P' and Q—Q', there is suspended a spool carrier R (see Figs. 3 and 7) which is provided with oppositely disposed stud pins R' and $R^2$, which are secured in the inner shuttle plates $m'$ of each pair of shuttles, by means of screw pins $r$.

Between the shuttle plates $m'$ and the body portion of the spool carrier R, there are anti-friction rollers S, which are adapted to enter the radial slots $f$—$g'$, in the disks F' and G', hereinbefore described. The stud pin R', shown in section in Figs. 3 and 7, is provided with a longitudinal central opening $r'$ therethrough, from the outer end of which a tube $r^2$ extends through the outer shuttle plate $m$ of each shuttle M, N, O, P, and Q.

The shuttle carriers are each provided with a spring-pressed plate $R^3$. Within the spool carriers R are placed spools of wire T, which are supported therein by means of a spindle T', which is retained in place by the cotter-pin $t$ or other suitable means. The spring-pressed plate $R^3$ is actuated by the spring $r^3$, to always remain in contact with the wire on the spool, and prevent it from becoming unwound or loose on the spool, by reason of the recoil of the wire; and also acts to retard the rotation of the spool. The end of the wire $t'$ is inserted through the longitudinal central opening $r'$ in the stud pin R', and through the small tube $r^2$ (see Figs. 7 and 8), where it is then wound two or three times around the tension pulley U.

Journaled upon the plate $m$, on each of the shuttles M, N, O, P and Q, by means of the bolt U' and nut $U^2$, is a tension pulley U, over which tension pulley the wire $t'$ is wound and then passes between guide rollers $u$, at the rear end of the plates $m$, of the shuttles M, N, O, P and Q. To insure the shuttles M—M', N—N', O—O', P—P', and Q—Q', to pass from one of the loops $B^5$ of the raceway to the opposite loop B⁴, and vice versa, I provide on the front-guide-plate B, and rear-guide-plate B', triangular plates V and V'; the plate V engaging and guiding the upper side of the shuttle P, and the lower plate V' engaging the lower side thereof, before the lower roller $m^3$ in each pair of shuttles reaches the opening in the raceway to the opposite loop thereof, as illustrated in Fig. 4.

In front of the plates L, supported upon uprights W—W—W—W, which are secured upon the base A, are plates W'—W', the rear edges of which are curved outwardly, as shown in Figs. 2 and 3; said plates W' being yieldingly supported against the plates L by means of the uprights W.

In operation, spools of wire T are placed in the spool carriers R, there being preferably five shuttles and spool carriers equally distributed among ten pairs of radial slots $f$ and $g'$ in the disks F' and G', and the ends T' of the wires are threaded through the shuttles and their associated tension devices as hereinbefore described, and then are looped around the pins L' and L² (see Figs. 1 and 2). Power is then applied to the driving pulley K⁴, which, through the gears and associated mechanism hereinbefore described, causes the pairs of shuttles, each pair supporting its spool of wire, to traverse the raceways B⁴ and B⁵, as hereinbefore described, as shown by the arrows in Fig. 1, so that the wire supplied from the spool carried by the shuttle Q will be drawn around the pin L', while the wire supplied by the spool carried by the shuttle N will be drawn tightly around the pin L², and the wire carried by the shuttle M will be drawn around the pin L', and so on *ad infinitum*, each succeeding shuttle drawing its wire around one or the other of the pins L' or L², behind the last succeeding loop thereon, thereby forcing the prior loops off of the end of the said pins.

During this operation the plates W' act as guides to prevent the long loops of wire from becoming tangled or distorted, until they are pulled by their respective shuttles, in their traverse away from the pins L' and L², tightly up against said pins. It will be observed, that as the wire is taken off of the spools T, the spring-pressed plates R³, in the spool carriers R, follow up, and as the diameters of the coils of wire on the spools T gradually decrease, the pressure of the plates R³ thereagainst also decreases; in other words, the braking action of the plates R³ against the coils of wire T, is automatically adjusted as the wire is taken off of the spool.

Having thus fully described the construction and operation of mechanism embodying my invention, so as to enable others to utilize the same, I am aware that many modifications therein may be made by those skilled in the art, without departing from the scope of my invention; therefore what I claim as new, and desire to secure by Letters-Patent, is:

1. In a machine of the character described, a front figure-eight guideway, a rear figure-eight guideway arranged in spaced relation to said front guideway, the axes of the loops of said rear guideway being in alinement with the axes of the loops of said front guideway, a spool carrier mounted in the space between said front and rear guideways, and means operating between said front and rear guideways for causing said spool carrier to traverse said guideways, substantially as set forth.

2. In a machine of the class described, a front figure-eight guideway, a rear figure-eight guideway arranged in spaced relation to said front guideway, the axes of the loops of said rear guideway being in alinement with the axes of the loops of said front guideway, a plurality of spool carriers mounted in the space between said front and rear guideways, a rotating spool-carrier actuating-mechanism operating in the space between said front and rear guideways, and engaging said spool carriers to cause them to traverse said guideways, substantially as set forth.

3. In a machine of the class described, a baseplate, a front and rear guide-plate thereon having figure-eight raceways therein, said rear guide-plate having openings at the axis of each loop of said raceway, a hollow shaft in each of said openings, a pair of spaced disks on each of said hollow shafts between said guide-plates having coincident radial slots in the peripheries thereof, journal bearings secured upon said baseplate to support said hollow shafts, spur gears non-rotatably secured upon each of said hollow shafts, a pair of non-rotatable shafts extending through said hollow shafts, means to non-rotatably support the rear end of each of said non-rotatable shafts, a plate secured upon the front end of each of said non-rotatable shafts, a coil-forming-pin supported by each of said plates over the central portion of the figure-eight raceway in said front guide-plate, a shuttle in each of said raceways, a spool-carrier having an opening leading therefrom through the shuttle in the front raceway supported between said shuttles and adapted to enter one of said radial slots in each of said disks, and gear and shaft mechanism to cause said spur-gears and disks to rotate in opposite directions, substantially as set forth.

4. In a machine of the class described, a guide-plate having a figure-eight raceway therein, a shuttle in said raceway, and triangular plates secured on said guide-plate above and below the crossing of said raceway between the loops thereof so that the inclined edges thereof will be parallel with the raceways and adapted to cause said shuttle to cross from one loop of the raceway to the other, substantially as set forth.

5. In a machine of the class described, a spool-carrier mechanism, supporting studs on opposite sides thereof, a raceway plate in front of said spool-carrier, a raceway plate behind said spool-carrier mechanism, said raceway plates receiving and supporting the studs on said spool-carrier, and mechanism operating between said front and rear raceway plates to cause said studs to traverse the raceway in each of said raceway plates, substantially as described.

6. In a machine of the class described, a hollow shaft, spool-carrier operating disks on said hollow shaft, a gear wheel on said hollow shaft, a journal bearing on said hollow shaft between said gear wheel and said disks to support the rear end of said hollow shaft, a non-rotatable shaft within said hollow shaft to support the front end of said hollow shaft, and a bracket at the rear of said gear wheel engaging and supporting the rear end of said non-rotatable shaft, substantially as set forth.

In testimony whereof I affix my signature.

CHARLES C. SELEY.

Copies of this patent may be obtained for five cents each, by addressing the "Commissioner of Patents, Washington, D. C."